US012629867B2

(12) United States Patent
Thompson

(10) Patent No.: US 12,629,867 B2
(45) Date of Patent: May 19, 2026

(54) PREPREG TAPE ASSEMBLY

(71) Applicant: GENERAL ELECTRIC COMPANY, Schenectady, NY (US)

(72) Inventor: Anthony Mark Thompson, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 516 days.

(21) Appl. No.: 18/087,047

(22) Filed: Dec. 22, 2022

(65) Prior Publication Data

US 2024/0208108 A1    Jun. 27, 2024

(51) Int. Cl.
B29B 15/12         (2006.01)
(52) U.S. Cl.
CPC .................................. B29B 15/125 (2013.01)
(58) Field of Classification Search
CPC ....................................................... B29L 5/125
See application file for complete search history.

(56) References Cited

U.S. PATENT DOCUMENTS

| | | | |
|---|---|---|---|
| 2,746,491 A | | 5/1956 | Sonneborn et al. |
| 2,775,022 A | | 12/1956 | Davis |
| 3,471,322 A | | 10/1969 | Medney |
| 3,530,212 A | * | 9/1970 | Harris ..................... F16F 1/368 |
| | | | 273/DIG. 7 |
| 3,619,317 A | * | 11/1971 | Shulver ................. B29B 15/125 |
| | | | 156/196 |
| 5,205,898 A | * | 4/1993 | Wilson .................. B29C 70/526 |
| | | | 156/181 |
| 6,926,853 B2 | | 8/2005 | Hinc et al. |
| 7,297,740 B2 | | 11/2007 | Dyksterhouse |
| 7,484,949 B2 | | 2/2009 | Hinc et al. |
| 2002/0094352 A1 | * | 7/2002 | Guo ......................... D01D 5/30 |
| | | | 425/198 |
| 2002/0179220 A1 | * | 12/2002 | Cottier .................... C04B 28/02 |
| | | | 156/39 |
| 2019/0210307 A1 | | 7/2019 | Ponsolle et al. |
| 2019/0352829 A1 | | 11/2019 | Tibor et al. |

FOREIGN PATENT DOCUMENTS

| | | |
|---|---|---|
| CN | 111674061 A | 9/2020 |
| GB | 769326 | 3/1957 |

OTHER PUBLICATIONS

K.S. Raper, J.A. Roux, T.A. McCarty, and J.G. Vaughan, "Investigation of the pressure behavior in a pultrusion die for graphite/epoxy composites," Composites: Part A 30 (1999) 1123-1132.

* cited by examiner

*Primary Examiner* — Xiao S Zhao
(74) *Attorney, Agent, or Firm* — Dority & Manning, P.A.

(57)             ABSTRACT

A prepreg tape assembly for impregnating a dry fiber tow to make composite components. The prepreg tape assembly can include a bath defining a slurry reservoir, a series of rollers located in the bath, and a take-up drum located outside of the slurry reservoir. The prepreg tape assembly also includes a first metering device capable of metering slurry, where the first metering device has a tow passage. The tow passage includes an inlet and an outlet, where the inlet of the tow passage overlies or is located in the slurry reservoir.

19 Claims, 9 Drawing Sheets

PREPREG TAPE ASSEMBLY

TECHNICAL FIELD

The present specification generally relates to a prepreg tape assembly for impregnating a dry fiber tow, more particularly, to a prepreg tape assembly having at least one metering device.

BACKGROUND

Polymer matrix composite (PMC) or ceramic matrix composite (CMC) articles generally comprise a fibrous or filamentary reinforcement material embedded in a matrix material. The reinforcement material serves as the load-bearing constituent of the PMC or CMC in the event of a matrix crack, while the matrix protects the reinforcement material, maintains fiber orientation, and serves to dissipate loads to the reinforcement material. PMC's or CMC's are frequently fabricated from multiple layers of "prepreg," which is typically a tape-like structure comprising the reinforcement material impregnated with a slurry or resin that contains a precursor of the matrix material and can include one or more organic binders.

Prepregs for continuous fiber ceramic composite (CFCC) materials or continuous fiber polymer composite (CFPC) materials frequently comprise a two-dimensional fiber array having a single layer of unidirectionally-aligned tows (bundles of individual filaments) impregnated with a matrix precursor material to create a generally two-dimensional laminate. Multiple plies of the resulting prepregs are then stacked and optionally debulked to form a laminate preform, a process referred to as "lay-up." After the "lay-up" process is complete, one or more of heating/firing, compression, cleaning, addition/application of material, or shaping processes can be completed to form the desired PMC or CMC article from the prepreg "lay-up."

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
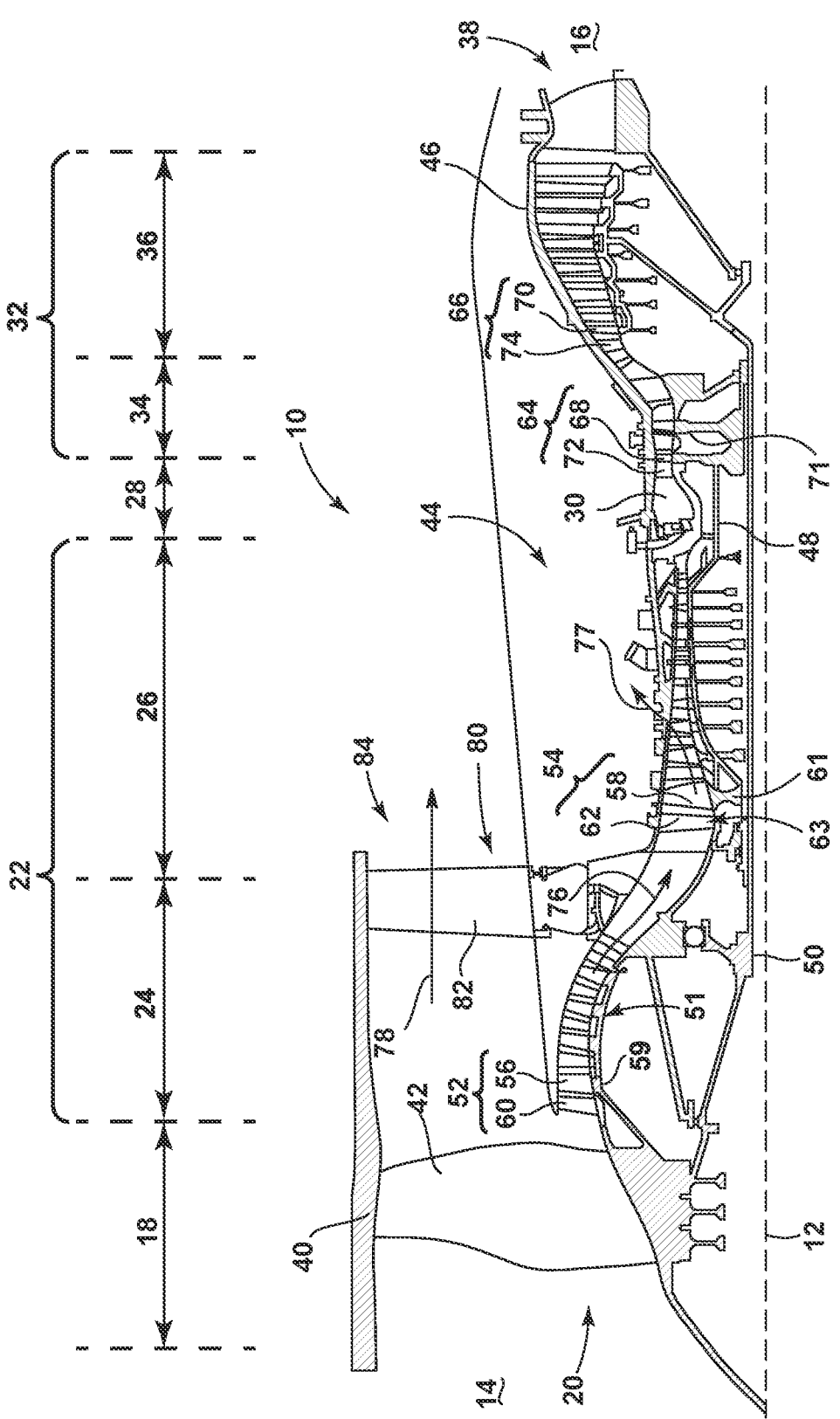
FIG. 1 is a schematic cross-sectional view of a turbine engine in accordance with an exemplary embodiment of the present disclosure.

Aspects of the disclosure herein are directed to a prepreg tape assembly for impregnating a dry fiber tow to make composite components. The prepreg tape assembly includes a slurry bath that defines a slurry reservoir. A series of rollers are at least partially submerged in the slurry reservoir. A first metering device has a first end and a second end, where the first end can overlay the surface of the slurry reservoir. It is contemplated that the first end can be located below a surface of the slurry reservoir.

The tow is pulled through the slurry in the slurry reservoir as it winds around the series of rollers. The slurry impregnates the tow and can create a slurry layer surrounding the tow. The tow then passes through the first metering device. The first metering device meters or otherwise regulates the thickness of the slurry layer on the tow. That is, the first metering device reduces the variability in the amount of slurry on the prepreg tape.

A second metering device can be used to further control the slurry drawn up by the tow from the reservoir. The second metering device can receive tow from the first metering device prior to winding the tow on the drum.

A winding technique is used to form the impregnated tow into a unidirectional prepreg tape at the drum. The unidirectional prepreg tape can then be used for lay-up of the composite preform for at least a portion of a composite component.

While illustrated as ultimately forming components for a turbine engine, it will be understood, however, that aspects of the disclosure described herein are not so limited and can have general applicability to creating CMC and PMC component for other vehicles, structures, or applications.

Traditionally, pulling the tow from the slurry reservoir can encourage slurry drift towards a front wall of the slurry bath. When the slurry drifts towards the front wall, less slurry surrounds the tow at the first roller of the series of rollers. The depletion of slurry at one or more rollers can decrease impregnation or absorption of the slurry by the tow. The depletion of slurry can result in gaps in the prepreg tape and/or inconsistencies in thickness of the prepreg tape.

Aspects described herein directed to the prepreg tape assembly minimize or eliminate the slurry drift in the slurry bath. Aspects described herein also provide an improved metering system that reduces the variance of the thickness of the prepreg tape by metering the slurry layer carried by the tow.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the term "upstream" refers to a direction that is opposite the direction of the motion or conveyance of the tow, and the term "downstream" refers to a direction that is in the same direction as the motion or conveyance of the tow. The term "fore" or "forward" means in front of something and "aft" or "rearward" means behind something. For example, when used in terms of the direction of the motion or conveyance of the tow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein, is indicative of a material that does not include metal material. A composite can be a combination of at least two or more non-metallic elements or materials. Examples of a composite material can be, but not limited to, a polymer matrix composite (PMC), a ceramic matrix composite (CMC), carbon fiber, polymeric resin, thermoplastic, bismaleimide (BMI), polyimide materials, epoxy resin, glass fiber, and silicon containing matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through the molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fiber woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fiber provides the strength of the system, the glass fibers can be incorporated to enhance the impact properties, which is a design characteristic for parts located near the inlet of the engine, and the thermoplastic fibers provide the binding for the reinforcement fibers.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can include a matrix and reinforcing fibers with oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3$ $2SiO_2$), as well as glassy aluminosilicates.

In certain non-limiting examples, the reinforcing fibers can be bundled and/or coated prior to inclusion within the ceramic matrix. For example, bundles of the fibers can be formed as a reinforced tape, such as a unidirectional reinforced tape. A plurality of the tapes can be laid up together to form a preform component. The bundles of fibers can be impregnated with a slurry composition prior to forming the preform or after formation of the preform. The slurry (or resin) can contain one or more of matrix precursor materials, organic binders, or solvents.

The preform can then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft, where the cross-section is generally circular symmetric about a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by core casing 46, which can be coupled with the fan casing 40.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disc 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disc 71, which is mounted to the corresponding one of the HP and LP spools 48, 50. The turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor.

A remaining portion of the airflow 78 bypasses the LP compressor 24 and engine core 44 and exits the turbine engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
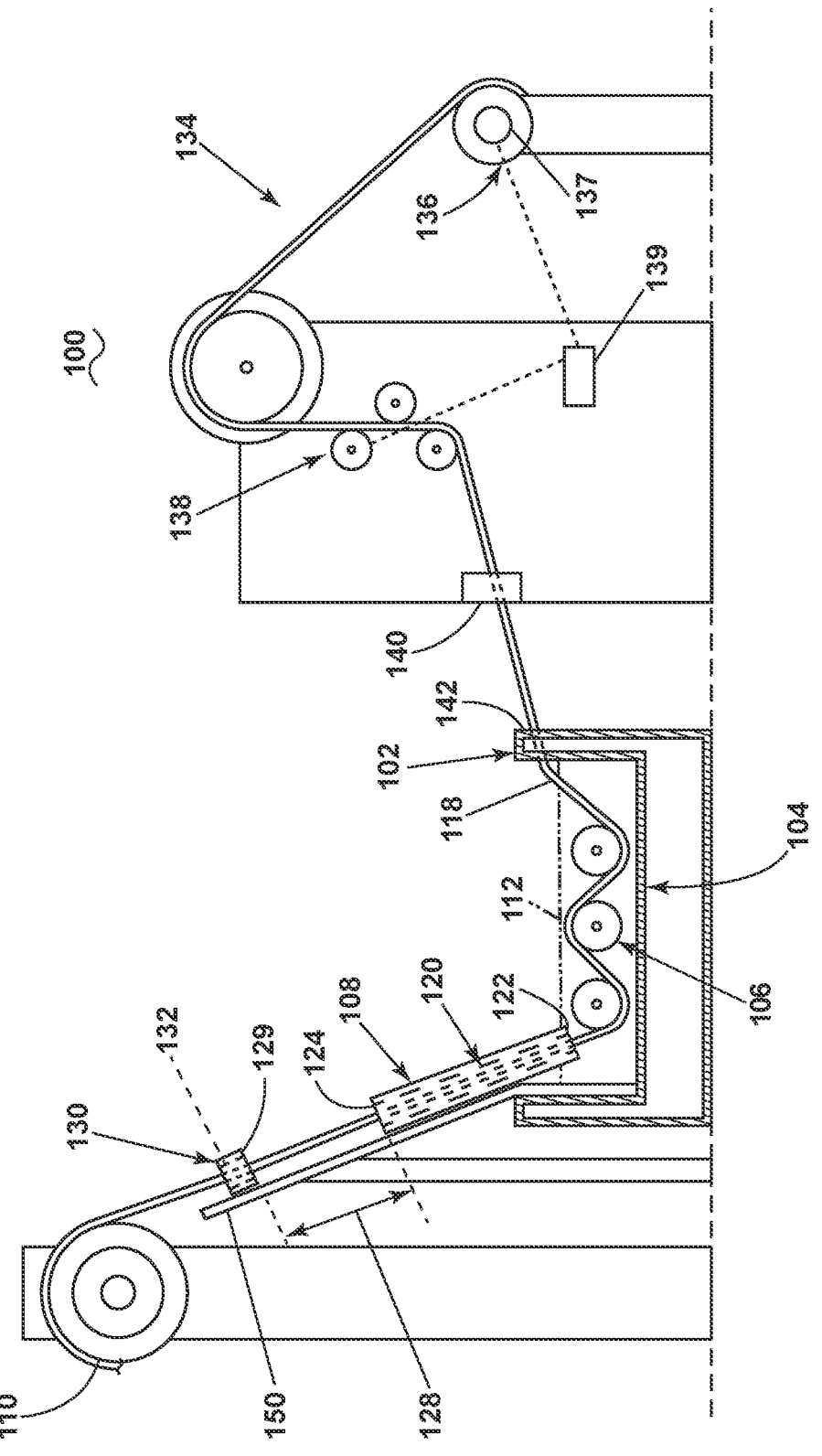
FIG. 2 is a schematic illustration of an apparatus for forming prepreg tape, the apparatus being a prepreg tape assembly in accordance with an exemplary embodiment of the present disclosure.

FIG. 2 is a schematic illustration of an apparatus for forming prepreg tapes illustrated as a prepreg tape assembly 100. Prepreg tape formed from the prepreg tape assembly 100 can be used to form a variety of CMC or PMC or CMC/PMC components. In another different and non-limiting example, a portion of the prepreg tape assembly 100 can be used to form a metal matrix composite (MMC) component.

By way of non-limiting example, the prepreg tape can be used to form one or more portions of the fan 20 (FIG. 1), the compressor blades 56, 58 (FIG. 1), the compressor vanes 60, 62 (FIG. 1), the turbine blades 68, 70 (FIG. 1), the turbine vanes 72, 74, (FIG. 1) one or more portions of the combustor 30 (FIG. 1), other elements located in the combustion section 28 (FIG. 1), or one or more portions of a shroud or other airfoil.

The prepreg tape assembly 100 includes a bath, illustrated as a slurry bath 102, a series of rollers 106, a first metering device 108, and a take-up drum 110. The slurry bath 102 defines a reservoir illustrated as a slurry reservoir 104. A slurry surface 112 is defined at an interface between the slurry of the slurry reservoir 104 and another material illustrated, by example, as ambient air.

The series of rollers 106 are illustrated as rollers, but can be pullies, wheels, or any other known mechanism for tensioning or directing a tow 118 within the slurry reservoir 104. The tow 118 is illustrated as a dry fiber tow that is impregnated with slurry when the tow 118 enters the slurry reservoir 104. The tow 118 can be in the form of sets of fiber bundles. The fiber bundles can include, for example, silicon carbide, silicon nitride, silicon, or any combination therein. However, any number or type of materials are possible to use to form the tow 118.

The series of rollers 106 are located in the slurry bath 102. While the series of rollers 106 are illustrated as completely submerged in the slurry reservoir 104, it is contemplated that one or more of the series of rollers 106 can be partially submerged in the slurry reservoir 104. It is further contemplated that one or more portions of one or more rollers of the series of rollers 106 can extend beyond the boundaries of the slurry bath 102. While illustrated as having three rollers, any number of rollers are contemplated in the series of rollers 106, including one.

The first metering device 108 extends from a first end 122 to a second end 124. The first end 122 overlays the slurry reservoir 104, is located at the slurry surface 112, or is submerged in the slurry reservoir 104. That is, the first end 122 can be submerged in the slurry of the slurry bath 102. The first metering device 108, as it extends from the first end 122 to the second end 124, can extend from within the slurry reservoir 104 to outside or above the slurry surface 112. That is, the first metering device 108 can reach out from beneath or below the slurry surface 112 to above the slurry surface 112, where the first end 122 is beneath or below the slurry surface 112 and the second end 124 is located above the slurry surface 112.

A tow passage 120 is defined by the first metering device 108. The tow passage 120 extends from the first end 122 to the second end 124. While illustrated as a through passage, the tow passage 120 can be formed by any one or more of a recess, port, or channel (see, for example, FIG. 6 and FIG. 7). The tow passage 120 of the first metering device 108 is used to control the amount of slurry carried by the tow 118. That is, the tow 118, having passed through the tow passage 120, has less slurry coupled to or carried by the tow 118 when the tow 118 is downstream of the second end 124 as compared to the amount of slurry coupled to or carried by the tow 118 when the tow 118 is upstream of the first end 122.

The take-up drum 110 is separate or spaced from the slurry bath 102. The take-up drum 110 and one or more other components of the prepreg tape assembly 100, such as the slurry bath 102, can move relative to one another. That is, it is contemplated that the take-up drum 110 can move relative to the slurry bath 102 and/or portions of the slurry bath 102 can move relative to the take-up drum 110.

Movement of the take-up drum 110 or movement of the one or more other components of the prepreg tape assembly 100 with relationship to the take-up drum 110 can control the pitch at which the tow is laid down on the take-up drum 110. Tow can be wrapped at a predetermined pitch such that each tow winding touches, but does not completely overlap, the tow winding from the previous take-up drum 110 revolution. The overlap of consecutive tow windings, provided from a predetermined and constant pitch, provides a continuous unidirectional prepreg tape.

Pitch is used to control the area density of the matrix and the amount of fiber material in the prepreg tape (i.e. the thickness of the prepreg tape). For example, if the pitch is small then there will be a lot of overlap between consecutive windings. The small pitch results in a large area density of the fiber and thicker prepreg tape. If the pitch is too large, then the wet tows will not overlap, and splits in the prepreg tape will appear.

The first metering device 108 is located between the slurry bath 102 and the take-up drum 110. Optionally, the first metering device 108 can extend from the slurry reservoir 104 towards the take-up drum 110. That is, as the first metering device 108 extends from beneath the slurry surface 112 to above the slurry surface 112 the second end 124 of the first metering device 108 is closer to the take-up drum 110 than the first end 122.

As illustrated, by way of example, a second metering device 130 is included in the prepreg tape assembly 100. The second metering device 130 is spaced from the first metering device 108. The second metering device 130 is located downstream of the first metering device 108. The second metering device 130 can be, for example, a metering die.

The second metering device 130 can be located between the first metering device 108 and the take-up drum 110. That is, the tow 118 leaving the first metering device 108 is received by the second metering device 130. The second metering device 130 can further control the amount of slurry carried by the tow 118 exiting first metering device 108.

A distance 128 is measured from the second end 124 of the first metering device 108 to a receiving end 129 of the second metering device 130.

A channel, orifice, bore, or aperture 132 passes through or provides a recess or pass-through hole in the second metering device 130. The aperture 132 at least partially circumscribes the tow 118 as the tow 118 passes through at least a portion of the aperture 132.

As illustrated, by way of example, a tensioning device 134 is included in the prepreg tape assembly 100. The tensioning device 134 includes at least one source roll 136, a braking system 137 for controlling the resistance applied to the at least one source roll 136, and a tension sensor system 138.

The tow 118 can be unwound from the at least one source roll 136. A controller 139 can be in communication with the tension sensor system 138 and the braking system 137. Input from the tension sensor system 138 can be supplied to the controller 139. The controller 139 can use the input from the tension sensor system 138 to provide an output or otherwise control the braking system 137, such that the tension in the tow remains within a predetermined range as it unrolls from the at least one source roll 136.

While the at least one source roll 136 is illustrated as single roller, any number of source rolls 136 are contemplated. If multiple tows are provided to the tensioning device 134 from multiple source rollers, the tensioning device 134 can include multiple tension sensor systems and multiple speed control systems to regulate the tension in each of the tows.

Alternatively, it is contemplated in a differing and non-limiting example, if provided with multiple tows from multiple source rollers, the tensioning device 134 can include multiple speed control systems for each of the tows and an optional binding system located upstream of the tension sensor system 138. The optional binding system can weave, bind, wrap, twist, wind, or otherwise bind the tows from the multiple source rollers to define the tow 118.

While not illustrated, the tensioning device 134 can include any number or combination of processing elements, such as, but not limited to, sources of heat, light, vibration, or pressure that can be applied to the tow 118.

A tensioning device exit 140 allows the tow 118 to pass from the tensioning device 134 to the slurry bath 102. The tow 118 can be received by a bath receiving portion 142 of the slurry bath 102 that is illustrated, by way of example, as spaced from tensioning device exit 140. Alternatively, it is contemplated in a differing and non-limiting example, components of the tensioning device 134 or the tensioning device exit 140 can couple to or be included with the slurry bath 102. For example, by way of non-limiting example, connection between the tensioning device exit 140 and the slurry bath 102 can be an additional series of rollers designed to direct the tow 118 into the path of the series of rollers 106 in the slurry bath 102.

As illustrated, by way of example, a deflector 150 couples to or is directed towards the slurry bath 102. The deflector 150 is spaced from and located beneath the tow 118 to catch slurry disconnected or separated from the tow 118. The deflector 150 can direct or deflect the slurry received from the tow 118 towards the slurry reservoir 104. Slurry can be disconnected or separated from the tow 118, by way of non-limiting example, by the first metering device 108, the second metering device 130, or the first metering device 108 and the second metering device 130. While the deflector 150 is illustrated as a single ramp or guide, any number of deflectors 150 are contemplated. Alternatively, it is contemplated in a differing and non-limiting example, the deflector 150 can direct the slurry received from the tow 118 away from the slurry reservoir 104. That is, the slurry would not be directly recycled into the slurry reservoir 104.

Figure 3:
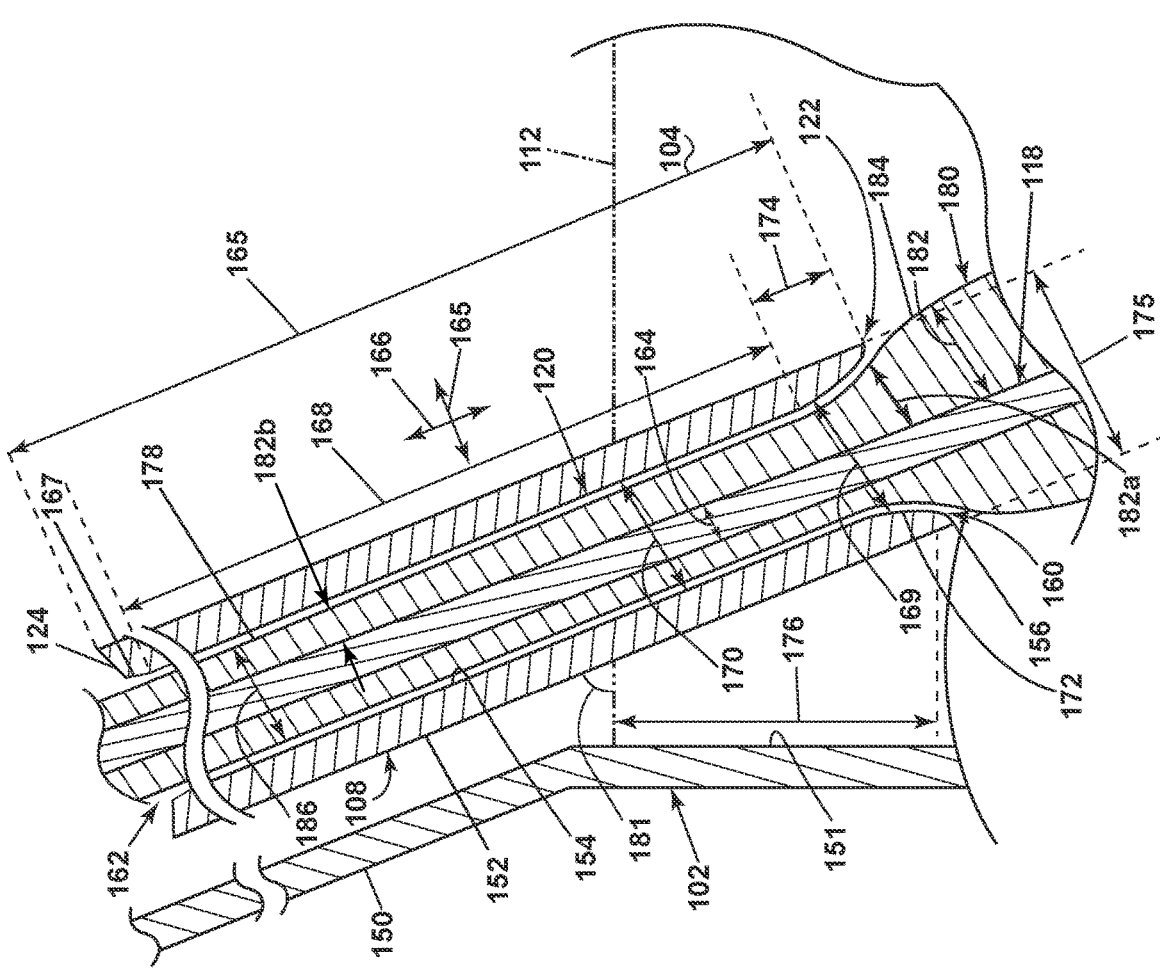
FIG. 3 is an enlarged schematic cross-section of a portion of the prepreg tape assembly of FIG. 2 further illustrating a first metering device and a slurry bath in accordance with an exemplary embodiment of the present disclosure.

FIG. 3 is an enlarged schematic cross-section further illustrating the first metering device 108. The first metering device 108 can be at least partially submerged, as illustrated by way of example, in the slurry reservoir 104 of the slurry bath 102.

Alternatively, it is contemplated that in a differing and non-limiting example, the first metering device 108 can overlay or overlap the slurry reservoir 104 of the slurry bath 102. That is, at least a portion of the first end 122 is spaced from but located above the slurry surface 112.

By way of non-limiting example, the first metering device 108 can be a hollow prism having a cross section that is a circle, oval, ellipse, square, any regular or irregular polygon, or any combination therein. That is, the first metering device 108 can include a complex or compound shape. Further, aspects of the drawings are not scaled and elements are often exaggerated to ease description and explanation.

The first metering device 108 is generally separate from the slurry bath 102. In other words, while the first metering device 108 is illustrated as coupled to or mounted to the slurry bath 102, the first metering device 108 does not pass through the walls or base of the slurry bath 102 that define the slurry reservoir 104. That is, the tow 118 exits the slurry reservoir 104 at or adjacent the slurry surface 112 and not through the one or more portions of the slurry bath 102 that define the slurry reservoir 104.

The first metering device 108 is defined by an exterior surface 152 generally spaced from an inner wall or an interior surface 154. That is, the exterior surface 152 is spaced from the interior surface 154 except where the surfaces converge or touch at an end. As illustrated, by way of example, the exterior surface 152 and the interior surface 154 connect at the first end 122 at a point 156. The interior surface 154 defines the tow passage 120 that allows at least a portion of the tow 118 to pass through the first metering device 108.

The tow passage 120 extends from an inlet 160 defined by the first end 122 to an outlet 162 defined by the second end 124. A portion of the tow 118 passes through the tow passage 120 from the inlet 160 to the outlet 162. The inlet 160 can be overlying or located within in the slurry reservoir 104.

A diameter of the tow 118 is illustrated as a tow diameter 164 measured at a cross section or generally perpendicular to a tow length direction 166, illustrated as direction 165. As used herein, the term "generally perpendicular" implies the formation of an angle between 80 degrees and 100 degrees. The tow diameter 164 can be measured while the tow 118 is tensioned. Alternatively, the tow diameter 164 can be measured while the tow 118 is not tensioned. It is contemplated that the tow diameter 164 can be is measured when the tow 118 is impregnated with slurry from the slurry reservoir 104. Alternatively, the tow diameter 164 can be measured upstream or prior to impregnation at the slurry bath 102.

Further, if the tow 118 carrying slurry, defined as a wet tow, has an oval or rectangular cross-section where a depth or a width of the tow varied based on direction, the diameter of the tow 118 is the smallest of the depth or the width of the tow 118. However, it is contemplated that the tow diameter 164 can be any cross-sectional dimension. The cross-section of the depth or the width of the tow can be taken in the plane of the direction 165, which is generally perpendicular to the motion or conveyance of the tow 118.

A passage diameter 169 is the span or diameter of the tow passage 120. The passage diameter 169 can be measured between spaced portions of the interior surface 154.

The passage diameter 169 can increase or decrease from the first end 122 to the second end 124 of the first metering device 108. It is further contemplated that the tow passage 120 can change cross-sectional shape from the first end 122 to the second end 124 of the first metering device 108. That is, the increase, decrease, or change in the passage diameter 169 can be a change in the shape of the first metering device 108, a change in the spacing between the exterior surface 152 and the interior surface 154, a change in the spacing between the portions of the interior surface 154 that define the tow passage 120, or a combination thereof.

A tapered portion 172 of the tow passage 120 is defined by a portion of the tow passage 120 where the passage diameter 169 is changing. The tapered portion 172 is illustrated, by way of example, as extending a tapered distance 174 from the first end 122 towards the second end 124. That is, the tapered distance 174 can be measured in the tow length direction 166.

It is contemplated that the tow passage 120 can include any number of tapered portions. By way of non-limiting example, the interior surface 154 includes an outlet taper 167 at or adjacent the second end 124. The outlet taper 167 can taper such that the diameter of the outlet 162 is greater than a minimum passage diameter 170.

The minimum passage diameter 170 is defined as the passage diameter 169 having the smallest value. The minimum passage diameter 170 is measured at the narrowest portion of the tow passage 120. It is contemplated that the minimum passage diameter 170 can be a portion of the first metering device 108 that extends out of the slurry reservoir 104. That is, the minimum passage diameter 170 can be located above the slurry surface 112 of the slurry reservoir 104.

The tow diameter 164 of the tow 118 is less than the minimum passage diameter 170. That is, a ratio of the minimum passage diameter 170 to the tow diameter 164 is greater than one. More specifically, the ratio of the minimum passage diameter 170 to the tow diameter 164 can be between 1 and 10. The minimum passage diameter 170 must be larger than the tow diameter 164 to allow the tow 118 to pass through the tow passage 120. However, if the ratio between the minimum passage diameter 170 and the tow diameter 164 is too large or greater than 10, the slurry carried by the tow 118 is not uniformly metered.

A device length 165 can be measured from the first end 122 to the second end 124 of the first metering device 108. The tapered distance 174 can be equal to or between 0.5% and 95% of the device length 165 or a metering length 168 (also called a landing area). The tapered distance 174 allows the tow 118 to gradually enter the metering length 168.

The metering length 168 is a length of first metering device 108 where the passage diameter 169 is the minimum passage diameter 170. That is, the metering length 168 can be measured in the tow length direction 166 where the passage diameter 169 is the minimum passage diameter 170. The metering length 168 can be 25%-10,000% of the minimum passage diameter 170. If the metering length 168 is too short, say 25% or smaller when compared to the minimum passage diameter 170, the slurry on the tow 118 may not be metered properly to the desired thickness. If the metering length 168 is too long, or 10,000% or more of the minimum passage diameter 170, the first metering device 108 could be too large and require a greater distance between the first metering device 108 and the take up drum 110 to establish the desired pitch. The greater distance between the first metering device 108 and the take up drum 110 can allow gravity to have more time to affect the slurry on the tow, allow drying of slurry, or provide more opportunity for introduction of materials from the surrounding environment.

An inlet diameter 175 can be greater than the minimum passage diameter 170. It is contemplated that in the tapered portion 172 of the tow passage 120 the passage diameter 169 changes or decreases diameter from the inlet diameter 175 to minimum passage diameter 170.

The tapered portion 172 can include a contoured portion having a non-zero radius of curvature. Alternatively, it is contemplated that in a differing and non-limiting example, the tapered portion 172 can be stepped or change passage diameter at distinct intervals (not shown). Alternatively, it is further contemplated that in a differing and non-limiting example, that the tow passage 120 can include multiple tapered portions or protrusions (not shown) that extend from the interior surface 154 into the tow passage 120.

A slurry depth 176 is measured from the slurry surface 112 of the slurry reservoir 104 to the first end 122 of the first metering device 108 extending the greatest distance into the slurry reservoir 104 from the slurry surface 112.

The slurry depth 176 can decrease as slurry is carried by the tow 118 from the slurry reservoir 104. The slurry depth 176 can increase if slurry is added to the slurry bath 102.

Even as the slurry depth 176 changes, the slurry depth 176 can be at least 5% of the passage diameter 169 at the inlet 160 of the first metering die 108. When the slurry depth 176 is at least 5% of the passage diameter 169, the inlet 160 at the first end 122 can remain submerged in the slurry reservoir 104. Keeping the inlet 160 submerged decreases drift of the slurry in the slurry bath 102 towards a front wall 151 of the slurry bath 102.

The slurry depth 176 can be at least 100% of the tow diameter 164. When the slurry depth 176 is at 100% of the tow diameter 164, this ensures the tow 118, the inlet 160, and a portion of the tapered portion 172 remain submerged in the slurry reservoir 104. Having the tow 118, the inlet 160, and a portion of the tapered portion 172 further decreases drift of the slurry in the slurry bath 102 towards the front wall 151 of the slurry bath 102.

The deflector 150 is located beneath at least the second end 124 of the first metering device 108. The deflector 150 can couple to or otherwise extend from the front wall 151 of the slurry bath 102. Alternatively, the deflector 150 can be spaced from and overlie at last a portion of the front wall 151 to return slurry separated from the tow 118 at or downstream of the second end 124 to the slurry reservoir 104.

The tow 118 can have a tow exterior surface 178. While some slurry from the slurry reservoir can penetrate the tow 118, a slurry layer 180 can be defined by a portion of the slurry that couples, stick, or is otherwise drawn into the tow 118 by the motion or material of the tow 118 or the tow exterior surface 178. The slurry layer 180 can vary in thickness. A slurry thickness 182 can be measured from the tow exterior surface 178 of the tow 118 to an outermost extent 184 of the slurry layer 180. A first thickness 182*a* of the slurry layer 180 is measured from the tow exterior surface 178 of the tow 118 to the outermost extent 184 of the slurry layer 180 upstream or at the inlet 160.

A second thickness 182*b* is measured past the tapered portion 172 and upstream of the outlet taper 167. It is also contemplated that the second thickness 182*b* can be measured at the minimum passage diameter 170. The first thickness 182*a* is greater than or equal to the second thickness 182*b*.

The second thickness 182*b* of the slurry layer 180 can be equal to or between 0.1% and 500% of the tow diameter 164. More specifically, the thickness 182*b* of the slurry layer 180 can be equal to or between 1% and 250% of the tow diameter 164. When the slurry layer 180 is less than 1% of the tow diameter 164, the prepreg tape may not be the desired material density to obtain desired strength or flexibility. When the slurry layer 180 is greater than 250% of the tow diameter 164, each winding of the tow 118 could provide slurry to more than one previous winding. The abundance of slurry could increase the variability in the thickness of the prepreg tape.

While illustrated as having a gap between the outermost extent 184 of the slurry layer 180 and the interior surface 154, it is contemplated that the outermost extent 184 of the slurry layer 180 can be in contact with the inner wall at one or more portions of the tow passage 120.

An angle 181 is defined between one or more portions of the first metering device 108 and one or more portions of the slurry bath 102 or the slurry reservoir 104. As illustrated, by way of example, the angle 181 is measured between the slurry surface 112 of the slurry reservoir 104 and the exterior surface 152 of the first metering device 108. The angle 181 can be greater than 0 degrees and less than 90 degrees. Leaving the slurry reservoir 104 at a non-zero angle can increase pitch control and/or allow for the tow 118 to travel directly to the take up drum 110.

Figure 4:
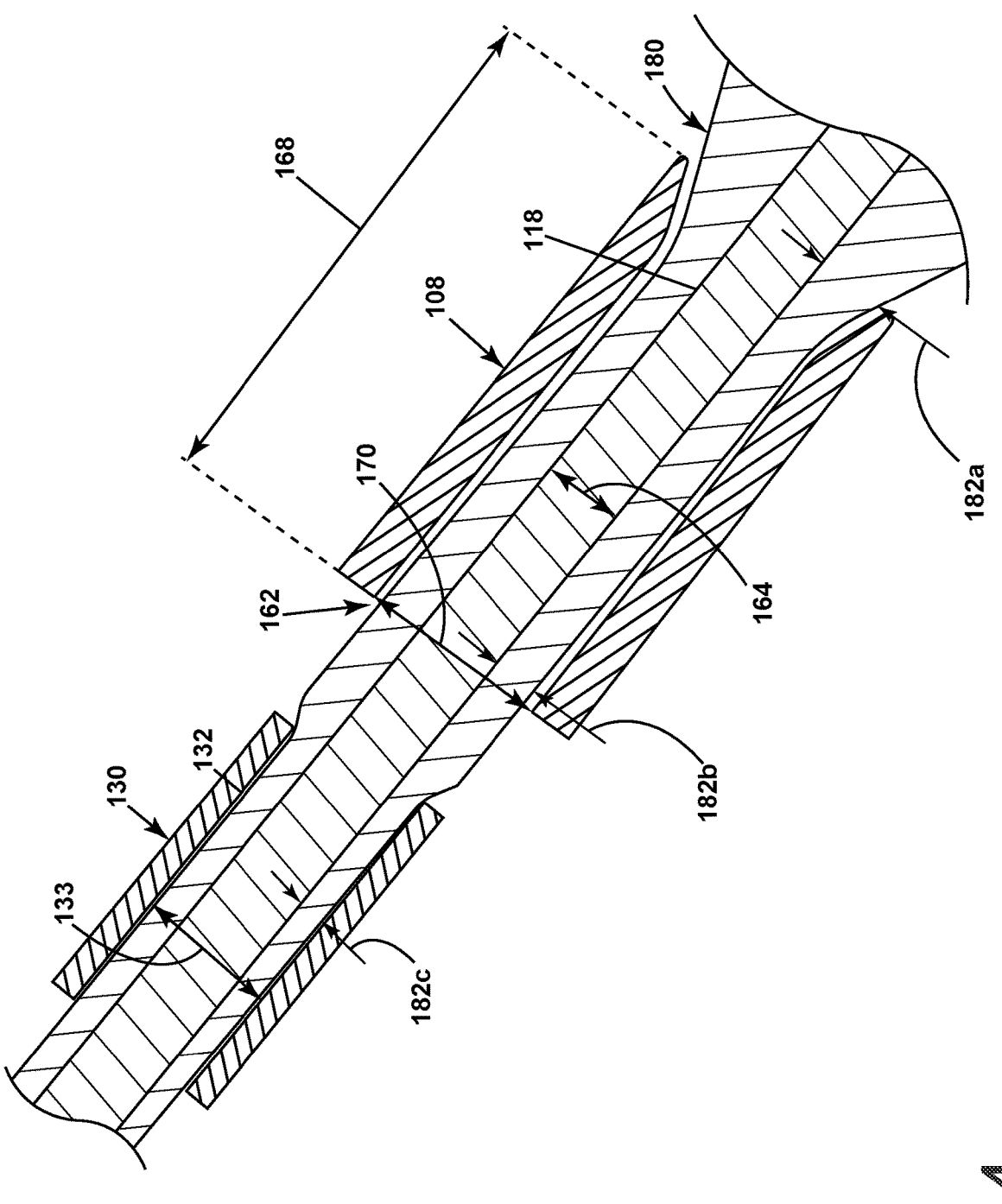
FIG. 4 is an enlarged schematic cross-section of a portion of the prepreg tape assembly of FIG. 2 further illustrating the first metering device of FIG. 3 and a second metering device in accordance with an exemplary embodiment of the present disclosure.

FIG. 4 is a schematic illustration of the first metering device 108, the second metering device 130, and the tow 118. As illustrated in FIG. 3, the first thickness 182*a* of the slurry layer 180 of the tow 118 at the inlet 160 or prior to entering the inlet 160 is greater than the second thickness 182*b*. While illustrated by way of non-limiting example as uniform, the second thickness 182*b* can vary in thickness by 0.5% or more from one location of the tow 118 to another. The second thickness 182*b* can depend on the minimum passage diameter 170. That is, the tow diameter 164 plus twice the second thickness 182*b* can be less than or equal to the minimum passage diameter 170.

A third thickness 182*c* of the slurry layer 180 is measured at or beyond the second metering device 130. The third thickness 182*c* can be less than or equal to the second thickness 182*b*. The third thickness 182*c* can depend on an aperture diameter 133 of the aperture 132. That is, the tow diameter 164 plus twice the third thickness 182*c* can be less than or equal to the aperture diameter 133.

The aperture diameter 133 of the second metering device 130 can be less than or equal to the minimum passage diameter 170 of the first metering device 108. The ratio of the aperture diameter 133 of the second metering device 130 to the minimum passage diameter 170 of the first metering device 108 can be less than or equal to 1. More specifically, the ratio of the aperture diameter 133 to the minimum passage diameter 170 of the first metering device 108 can be equal to or between 0.10 and 0.95. When the aperture diameter 133 of the second metering device 130 is less than or equal to the minimum passage diameter 170 of the first metering device 108, the tow layer 180 can be more precisely metered. Having the first metering device 108 and the second metering device 130 further reduces the variability in the thickness of the prepreg tape.

Optionally, the second metering device 130, can include one or more tapered portions (not shown). At the one or more tapered portions of the second metering device 130, the aperture diameter 133 can be greater than a minimum aperture diameter measured between the inlet and outlet of the second metering device 130.

In operation, a method for manufacturing a prepreg tape can include providing the tow 118 from the at least one source roll 136 (FIG. 2). The tow 118 can pass through the tensioning device 134 (FIG. 2), exiting the tensioning device 134 (FIG. 2) at the tensioning device exit 140 (FIG. 2).

The tow 118 then passes from the tensioning device 134 (FIG. 2) to the slurry bath 102 (FIG. 2 and FIG. 3). The tow 118 then passes over a series of rollers 106 (FIG. 2) at least partially submerged in the slurry reservoir 104 defined by the slurry bath 102 (FIG. 2 and FIG. 3). The tow 118 can absorb, receive, bond, carry, or any combination therein, at least a portion of the slurry from the slurry reservoir 104 (FIG. 2 and FIG. 3).

The slurry layer 180 can form around the tow 118 while the tow 118 is submerged in the slurry reservoir 104 (FIG. 3). To meter, limit, otherwise refine the first thickness 182*a* of the slurry layer 180 carried by the tow 118, the tow 118 passes into the first metering device 108. The first metering device 108 is illustrated, by way of example, as a slurry metering device having the shape of an enclosed tube. The open portion of the enclosed tube that is circumscribed by the walls of the tube defines the tow passage 120. The tow passage 120 can receive the tow 118 at the inlet 160. Optionally, the inlet 160 can be part of the tapered portion 172 of the tow passage 120. That is, the tow 118 passes into the tow passage 120 and through the tapered portion 172.

The tapered portion 172 of the tow passage 120 can decrease the amount of slurry carried by the tow 118. That is, the tapered portion 172 can decrease the first thickness 182*a* of the slurry layer 180 to the second thickness 182*b* as the tow 118 is pulled from the inlet 160 at the first end 122 of the first metering device 108 to the outlet 162 at the second end 124 of the first metering device 108.

The inlet 160 is illustrated as submerged in the slurry reservoir 104 (FIG. 3). The tow 118 entering at the submerged inlet 160 decreases the motion of slurry in slurry reservoir 104 (FIG. 3) towards the front wall 151. That is, the momentum transferred to the slurry reservoir 104 by the motion of the tow 118 over the series of rollers 106 and out of the slurry reservoir 104 is reduced in the tow length direction 166. In other words, the first metering device 108 having the first end 122 beneath the slurry surface 112 of the slurry reservoir 104 reduces the drift of slurry in the slurry bath 102 towards the front wall 151.

Minimizing the drift of the slurry reservoir 104 towards the front wall 151 ensures that none of the series of rollers 106 are depleted. That is, the series of rollers 106, including the entry roller, remains submerged a predetermined distance within the slurry reservoir 104 to ensure impregnation of the tow 118 as it passes over the series of rollers 106.

Once the tow 118 has passed from the first end 122 to the second end 124 of the first metering device 108, the tow 118 exits the tow passage 120 of the first metering device 108 at the outlet 162. Slurry carried by the tow 118 can disconnect or drip as the tow 118 exits the first metering device 108 and prior to the tow 118 entering the second metering device 130 or being wrapped about the take-up drum 110. The disconnected slurry can create a slurry run-off. The slurry run-off can be returned to the slurry reservoir 104 by the deflector 150.

The first metering device 108 can be a rigid metering device, such that while the tow 118 extends through the first metering device 108, the first metering device 108 or the tow passage 120 does not deform or change shape.

Optionally, the tow 118 can be received by the second metering device 130 spaced the distance 128 from the first metering device 108. The tow 118 can then pass through the orifice or the aperture 132 of the second metering device 130. To further refine the amount of slurry carried by the tow 118, the aperture 132 can have an aperture diameter 133 that is less than or equal to the minimum passage diameter 170 of the tow passage 120. The second metering device 130 can decrease the slurry layer 180 from the second thickness 182*b* to the third thickness 182*c* and thereby further reduce the variability of the thickness of the slurry drawn up by the tow 118.

It is contemplated that the tow exterior surface 178 is an average exterior and that fibers, for example, that are broken or strained can extend past the tow exterior surface 178 or be included or carried by the slurry layer 180.

Slurry carried by the tow 118 can disconnect or drip as the tow 118 enters the second metering device 130 and prior to being wrapped about the take-up drum 110. The deflector 150 can receive slurry from the tow 118 as the tow 118 enters the second metering device 130. Optionally, the deflector 150 can return the slurry to the slurry reservoir 104.

The tow 118, having been metered, can be wound, received, or otherwise wrapped about the take-up drum 110 for form prepreg tape. The metering of the tow 118 by the first metering device 108 or the first metering device 108 and the second metering device 130 reduces the variability in the amount of slurry on the prepreg tape.

A wet tow diameter 186 is measured at the minimum passage diameter 170 of the first metering device 108, where the wet tow diameter 186 is the diameter of the tow 118 with the slurry layer 180. The wet tow diameter 186 can be estimated or approximated as the tow diameter 164 plus two times the second thickness 182*b*. That is, the wet tow diameter 186 is within 10% of the tow diameter 164 plus two times the second thickness 182*b*.

The pitch at which the tows are wrapped on the take-up drum 110 (FIG. 2) can be based on the tow diameter 164, the minimum passage diameter 170, or the minimum aperture diameter. That is, the pitch can be equal to or between 50%-150% of the tow diameter 164, the minimum passage diameter 170, or the aperture diameter 133. Pitches greater than 100% are possible without splitting of the prepreg tape as the wet tow can flatten or widen as it is wrapped.

Figure 5:
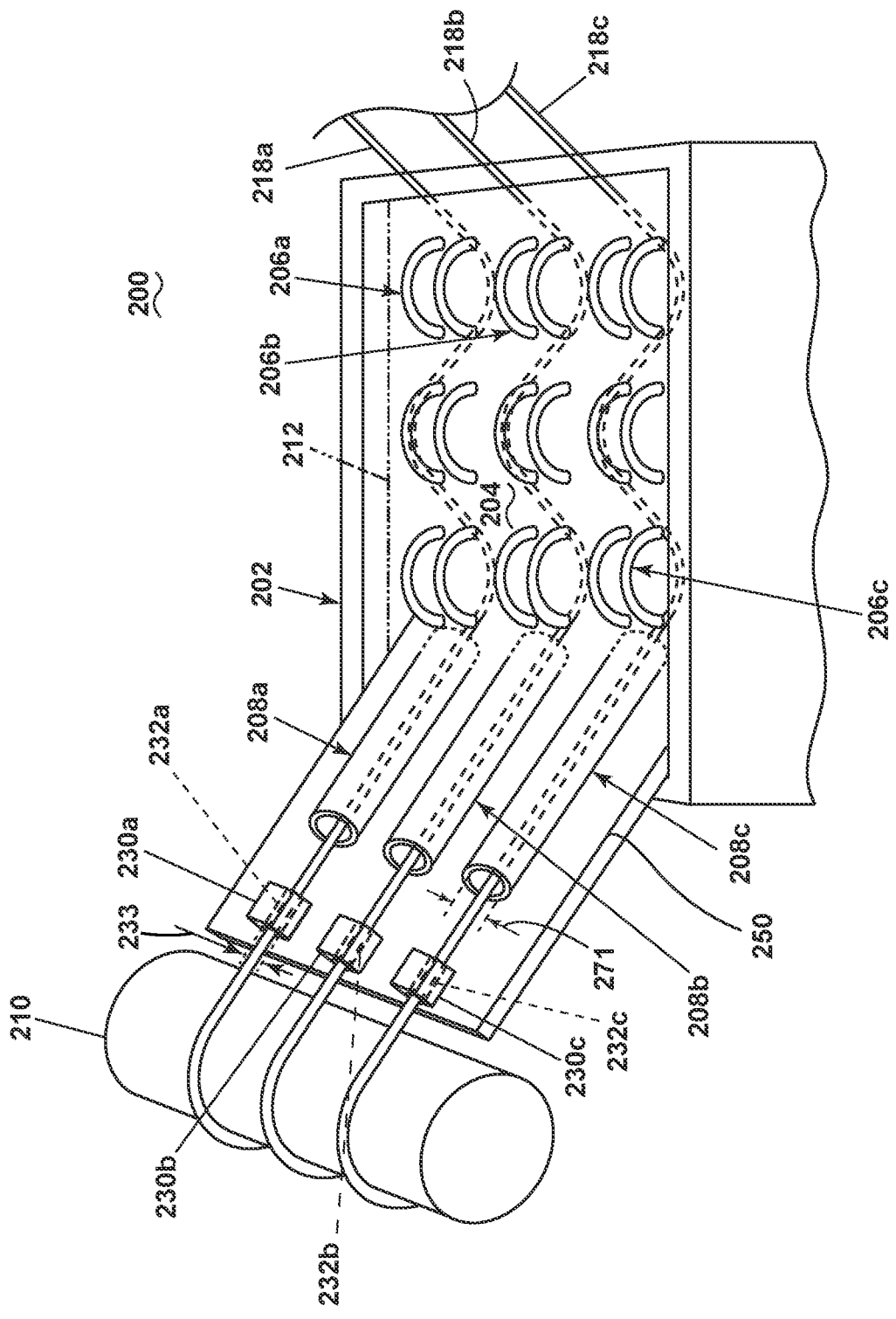
FIG. 5 is a variation of the prepreg tape assembly of FIG. 2 in accordance with another exemplary embodiment of the present disclosure.

FIG. 5 is a prepreg tape assembly 200 according to an aspect of the disclosure. The prepreg tape assembly 200 is similar to the prepreg tape assembly 100, therefore, like parts of the prepreg tape assembly 200 will be identified with like numerals increased by 100, with it being understood that the description of the like parts of the prepreg tape assembly 100 applies to the prepreg tape assembly 200, except where noted.

The prepreg tape assembly 200 includes a bath that is illustrated as a slurry bath 202 defining a reservoir illustrated as a slurry reservoir 204. A plurality of rollers of the prepreg tape assembly 200 are illustrated a first set of rollers 206*a*, a second set of rollers 206*b*, and a third set of rollers 206*c*. While illustrated as three sets of three rollers, the plurality of rollers 206*a*, 206*b*, 206*c* can be any number of sets of rollers, where the number of rollers in any one of the sets can be any number including 1. Portions of the plurality of first metering devices 208*a*, 208*b*, 208*c* that are below a slurry surface 212 of the slurry reservoir 204 are not illustrated to ease understanding.

The plurality of rollers 206*a*, 206*b*, 206*c* are illustrated, by way of example, as partially submerged in the slurry reservoir 204. It is contemplated that any roller, set of rollers, or subset of the plurality of rollers 206*a*, 206*b*, 206*c* can be submerged or at different locations with respect to a slurry surface 212 of the slurry reservoir 204.

The prepreg tape assembly 200 also includes a plurality of first metering devices 208*a*, 208*b*, and 208*c*, where each of the plurality of first metering devices 208*a*, 208*b*, 208*c* corresponds to each set of the plurality of rollers 206*a*, 206*b*, 206*c*. While illustrated as three first metering devices, it is contemplated that the plurality of first metering devices 208*a*, 208*b*, and 208*c* can be any number of first metering devices.

The plurality of first metering devices 208*a*, 208*b*, and 208*c* are illustrated, by way of example, as a plurality of enclosed tubes, where each enclosed tube of the plurality of enclosed tubes receives each tow from a plurality of tows 218*a*, 218*b*, 218*c*.

A take-up drum 210 receives the plurality of tows 218*a*, 218*b*, 218*c*. While illustrated as three tows, the plurality of tows 218*a*, 218*b*, 218*c* can be any number of tows. While illustrated as a single take-up drum 210, additional take-up drums are contemplated. For example, two tows of the plurality of tows 218*a*, 218*b*, 218*c* can be received by a first drum (not shown), while a third tow is received by a second drum (not shown).

A portion of each of the plurality of first metering devices 208*a*, 208*b*, 208*c* extends past the slurry surface 212 of the slurry reservoir 204. That is, the plurality of first metering devices 208*a*, 208*b*, 208*c* can extend from below the slurry surface 212 of the slurry that defines the slurry reservoir 204 to above the slurry surface 212.

A plurality of second metering devices 230*a*, 230*b*, 230*c* are included, by way of example, in the prepreg tape assembly 200. The plurality of second metering devices 230*a*, 230*b*, 230*c* are spaced from the plurality of first metering devices 208*a*, 208*b*, 208*c*.

Each second metering device of the plurality of second metering devices 230*a*, 230*b*, 230*c* include apertures 232*a*, 232*b*, 232*c*. A aperture diameter 233 can be measured for each aperture of the apertures 232*a*, 232*b*, 232*c*. The aperture diameter 233 can be the same for each aperture of the apertures 232*a*, 232*b*, 232*c*. Alternatively, it is contemplated in a differing and non-limiting example, that the aperture diameter 233 can vary from one second metering device to another metering device of the plurality of second metering devices 230*a*, 230*b*, 230*c*. It is also contemplated that the aperture diameter 233 within one or more second metering device of the plurality of second metering devices 230*a*, 230*b*, 230*c* can change as the one or more apertures 232*a*, 232*b*, 232*c* extend through the plurality of second metering devices 230a, 230b, 230c. The aperture diameter 233 can be less than or equal to the minimum passage diameter 170 of the tow passage 120 (FIG. 3). It is contemplated that the aperture diameter 233 can be less than the minimum passage diameter 170 measured between the inlet 160 and the outlet 162 (FIG. 3). It is further contemplated that the aperture diameter 233 can be less than an outlet diameter 271 of at the corresponding first metering device of the plurality of first metering devices 208a, 208b, 208c.

A deflector 250 can couple to or be directed towards the slurry bath 202. The deflector 250 is spaced from and located beneath the plurality of tows 218a, 218b, 218c to catch slurry disconnected or separated from the plurality of tows 218a, 218b, 218c. The deflector 250 directs or deflects the slurry received from the plurality of tows 218a, 218b, 218c towards or away from the slurry reservoir 204. While the deflector 250 is illustrated as a single ramp or guide, any number of deflectors 250 are contemplated.

As illustrated by way of example, the plurality of first metering devices 208a, 208b, 208c are generally equally spaced from a front wall of the slurry bath 202. Optionally, the plurality of first metering devices 208a, 208b, 208c can be unitarily formed. That is, the plurality of first metering devices 208a, 208b, 208c can be multiple passages through a single supporting structure.

In a different and non-limiting example, the plurality of first metering devices 208a, 208b, 208c can be angled so that the space between the front wall and each first metering device of the plurality of first metering devices 208a, 208b, 208c is different. It is further contemplated that the plurality of first metering devices 208a, 208b, 208c can be geometrically arranged (shifted vertically, horizontally, or any combination therein with respect to the front wall) to accommodate any passage diameter, while maintaining a suitable pitch between the multiple tows.

Figure 6:
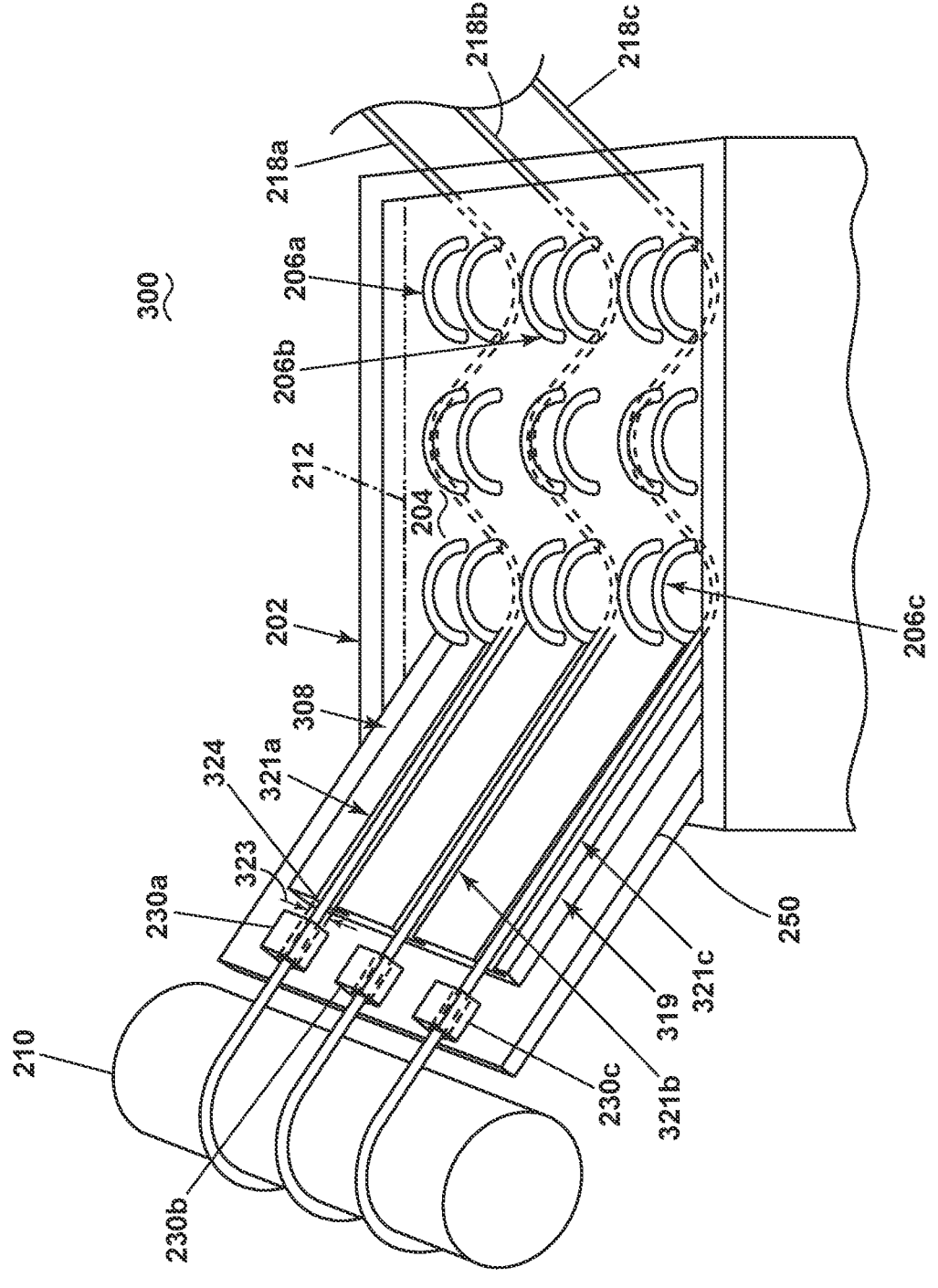
FIG. 6 is another variation of the prepreg tape assembly of FIG. 2 in accordance with another exemplary embodiment of the present disclosure.

FIG. 6 is a prepreg tape assembly 300 according to an aspect of the disclosure. The prepreg tape assembly 300 is similar to the prepreg tape assembly 100, 200 therefore, like parts of the prepreg tape assembly 300 will be identified with like numerals further increased by 100, with it being understood that the description of the like parts of the prepreg tape assembly 100, 200 applies to the prepreg tape assembly 300, except where noted.

The prepreg tape assembly 300 includes the slurry bath 202 defining the slurry reservoir 204, the plurality of rollers 206a, 206b, 206c. The prepreg tape assembly 300 also includes a first metering device 308 that is illustrated, by way of example, as a plate 319 having a plurality of open channels illustrated a plurality of channels 321a, 321b, 321c. Alternatively, it is contemplated in a differing and non-limiting example, that the plate 319 can be a plurality of plates, where one or more plates correspond to each channel of the plurality of channels 321a, 321b, 321c.

Each channel of the plurality of channels 321a, 321b, 321c can correspond to or receive each tow from the plurality of tows 218a, 218b, 218c. Further, each channel of the plurality of channels 321a, 321b, and 321c can correspond to each set of rollers of the plurality of rollers 206a, 206b, 206c. While illustrated as three channels, it is contemplated that the plurality of channels 321a, 321b, 321c can be any number of channels. That is, any number of channels and plates are contemplated.

Each channel the plurality of channels 321a, 321b, 321c can have a first end 322 (see FIG. 7) and a second end 324. While illustrated as having generally sharp corners, one or more of the plurality of channels 321a, 321b, 321c can be a U-shaped recess in the plate 319.

Each channel of the plurality of channels 321a, 321b, 321c can have a channel width 323. The channel width 323, while illustrated as uniform, can change as it extends from the first end 322 to the second end 324 of one or more of the plurality of channels 321a, 321b, 321c. The channel width 323 can be between 110% and 1,000% of the tow diameter 364 (FIG. 3).

A plurality of second metering devices 230a, 230b, 230c can be included in the prepreg tape assembly 300. The plurality second metering devices 230a, 230b, 230c are spaced from the first metering device 308. The aperture diameter 233 measured for each aperture of the apertures 232a, 232b, 232c can be less than or equal to the corresponding channel width 323.

The deflector 250 is spaced from and located beneath the plurality of tows 218a, 218b, 218c to catch slurry disconnected or separated from the plurality of tows 218a, 218b, 218c. The deflector 250 can direct or deflect the slurry received from the plurality of tows 218a, 218b, 218c towards the slurry reservoir 204. While the deflector 250 is illustrated as a single ramp or guide, any number of deflectors 250 are contemplated. It is also contemplated that the deflector 250 can be coupled to the plate 319.

Figure 7:
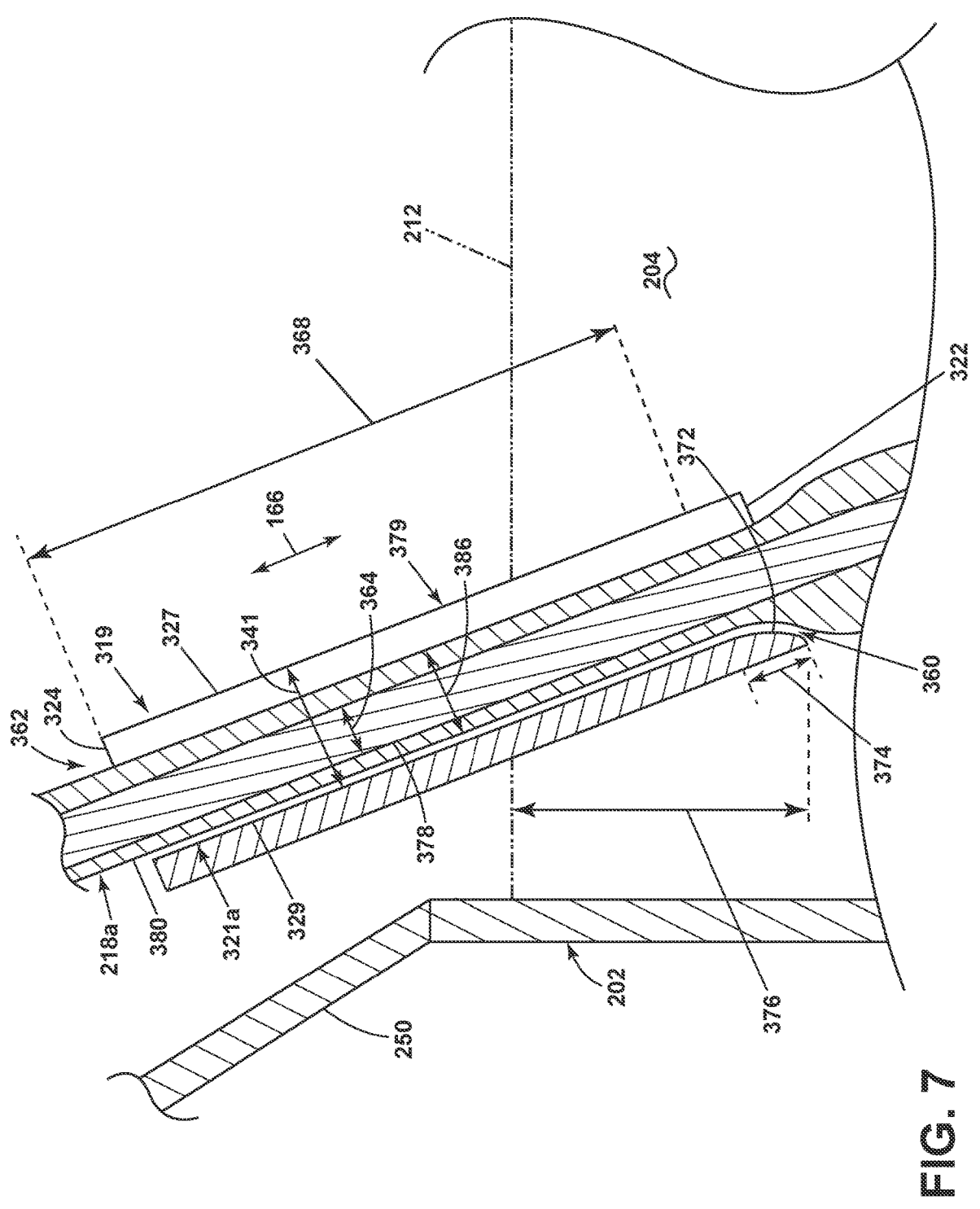
FIG. 7 is an enlarged schematic cross-section of a portion of the prepreg tape assembly of FIG. 6 further illustrating a first metering device and a slurry bath in accordance with another exemplary embodiment of the present disclosure.

FIG. 7 is an enlarged schematic cross-section further illustrating the first metering device 308. The first metering device 308 can be at least partially submerged, as illustrated by way of example, in the slurry reservoir 204 of the slurry bath 202. Alternatively, it is contemplated that in a differing and non-limiting example, the first metering device 308 can overlay the slurry reservoir 204 of the slurry bath 202 where the first end 322 is spaced from but located above the slurry surface 212. That is, at least a portion of the first metering device 308 can be overlying or located within in the slurry reservoir 204.

The first metering device 308 includes the channel 321a. Similar to the tow passage 120 (FIG. 3), the channel 321a extends from an inlet 360 located at or defined by the first end 322 to an outlet 362 located at or defined by the second end 324. A portion of the tow 218a passes through channel 321a from the inlet 360 to the outlet 362. The inlet 360 can be overlying or located within in the slurry reservoir 204.

The diameter of the tow 218a is illustrated as the tow diameter 364 that is measured at a cross section or generally perpendicular to the tow length direction 166. The metering length 368 is a length of the channel 321a in which the channel width 323 or a channel depth 341 is at a minimum. That is, the metering length 368 is measured along the tow passage or the channel 321a where the channel 321a has a minimum channel width. The metering length 368 can be 25%-10,000% of a minimum value of the channel width 323.

The channel depth 341 is the depth or greatest recessed point of the channel 321a. The channel depth 341 is measured between a bottom surface or a lower surface 329 to a top surface or upper surface 327.

The tow diameter 364 of the tow 118 or a wet tow diameter 386 can be less than, greater than, or equal to the channel depth 341. That is, a ratio of the channel depth 341 to the tow diameter 364 can be between 0.5 and 20. More specifically, the ratio of the channel depth 341 to the tow diameter 364 can be between 1 and 15. It is further contemplated that channel depth 341 can be between 110% and 1,000% of the tow diameter 364 or a wet tow diameter 386.

Ranges for the ratio of the channel depth 341 to the tow diameter 364 or the wet tow diameter 386 provide metering that reduces variability in the thickness of the prepreg tape.

The channel depth 341 can increase or decrease as the channel 321a extends from the first end 322 to the second end 324. It is further contemplated that the channel 321a can change cross-sectional shape as the channel 321a extends from the first end 322 to the second end 324. That is, the increase, decrease, or change in the channel depth 341 or the channel width 323 (FIG. 5) can be a change in the shape of the channel 321a, a change in the spacing between the lower surface 329 and the upper surface 327, or combination therein.

A tapered portion 372 of the channel 321a can be defined by a portion of the channel 321a that has a changing channel depth 341 or the channel width 323 (FIG. 5). The tapered portion 372 is illustrated, by way of example, as extending a tapered distance 374 from the first end 322 towards the second end 324. That is, the tapered distance 374 can be measured in the tow length direction 166. The tapered distance 374 can be equal to or between 0.5% and 95% of the metering length 368.

A slurry depth 376 can be measured from the slurry surface 212 of the slurry reservoir 204 to the first end 322 of the first metering device 308 extending the greatest distance into the slurry reservoir 204 from the slurry surface 212. The slurry depth 376 can be at least 5% of the channel depth 341. Further, the slurry depth 376 can be at least 100% of the tow diameter 364.

The space illustrated between a surface 378 of the tow 218a and the lower surface 329 can illustrate a slurry layer 380. While illustrated by way of example as spaced from the lower surface 329, the slurry layer 380 can be in contact with the lower surface 329 and the tow 218a. Similar to the enclosed tube illustrated as having the tow passage 120 (FIG. 3), the lower surface 329 and sidewall 379 of the channel 321a meters, restricts, or otherwise controls the amount or thickness of slurry carried by the tow 218a.

While illustrated as recessed channels, the plurality of channels 321a, 321b, 321c can be any structure such as, but not limited to planar baffles or multiple tubes. The baffles can be a single baffle or a combination of baffles. The one or more baffles can have a semi-circle, crescent, or airfoil shape.

It is also contemplated that the first metering device 308 can include a selectively coupled lid or top (see, for example, FIG. 8 and FIG. 9), such as, but not limited to a cover plate that overlies the plurality of channels 321a, 321b, 321c and can couple to the plate 319 to encase or enclose the plurality of channels 321a, 321b, 321c.

As illustrated by way of example, the plate 319 is generally equally spaced from a front wall of the slurry bath 202. In a different and non-limiting example, the plate 319 can be angled so that the space between the front wall and the plate 319 changes. It is further contemplated that the plurality of channels 321a, 321b, 321c can be geometrically arranged (shifted vertically, horizontally, or any combination therein with respect to the front wall) to accommodate any channel depth or channel width, while maintaining a suitable pitch between the multiple tows.

Figure 8:
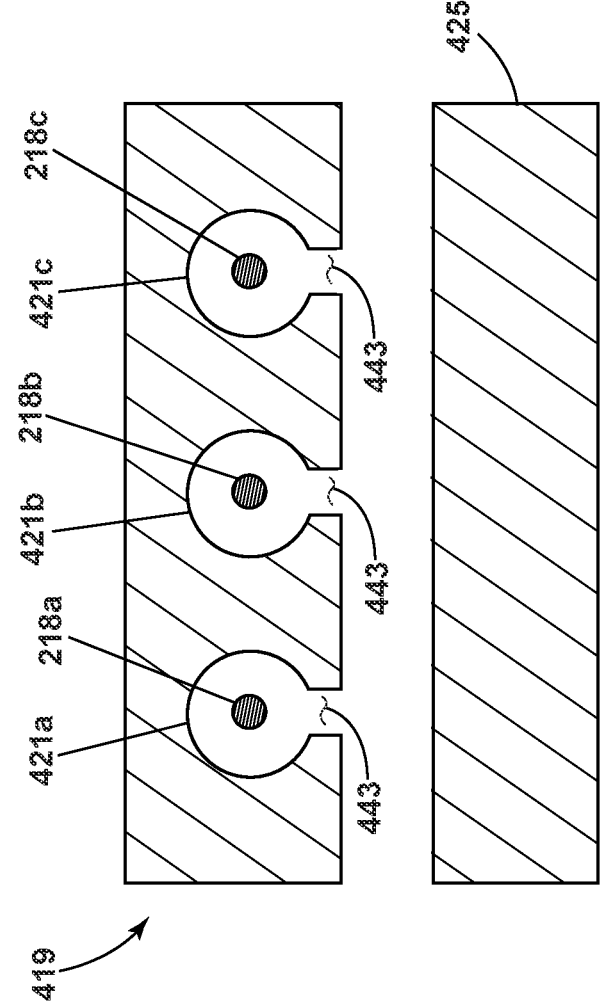
FIG. 8 is a partially exploded cross-sectional view of a plate from the prepreg tape assembly of FIG. 6 in accordance with another exemplary embodiment of the present disclosure.

FIG. 8 is a partially exploded cross-sectional view of a plate 419 having a plurality of channels 421a, 421b, 421c and a cover plate 425. The plate 419 is similar to the plate 319 and the plurality of channels 421a, 421b, 421c are similar to the plurality of channels 321a, 321b, 321c, therefore, like parts will be identified with like numerals increased by 100, with it being understood that the description of the like parts of the plate 319 and the plurality of channels 321a, 321b, 321c applies to the plate 419 and the plurality of channels 421a, 421b, 421c, unless otherwise noted.

The plurality of channels 421a, 421b, 421c receive the plurality of tows 218a, 218b, 218c. Entrance passages 443 can allow the plurality of tows 218a, 218b, 218c to enter the plurality of channels 421a, 421b, 421c. The entrance passages 443 are illustrated, by way of example, as being a straight or linear passage. It is contemplated that the entrance passages 443 can have any number of bends or curves.

Once the plurality of tows 218a, 218b, 218c are received by the plurality of channels 421a, 421b, 421c, the cover plate 425 can be used to cover the entrance passages 443 to retain the plurality of tows 218a, 218b, 218c in the plurality of channels 421a, 421b, 421c. The cover plate 425 can be a removable cover plate, wherein the cover plate 425 can be selectively removed from or attached to the plate 419. Alternatively, in another different and non-limiting example, the cover plate 425 can be rotatably or slidably coupled to the plate 425 to selectively allow access to or provide coverage for the entrance passages 443.

Figure 9:
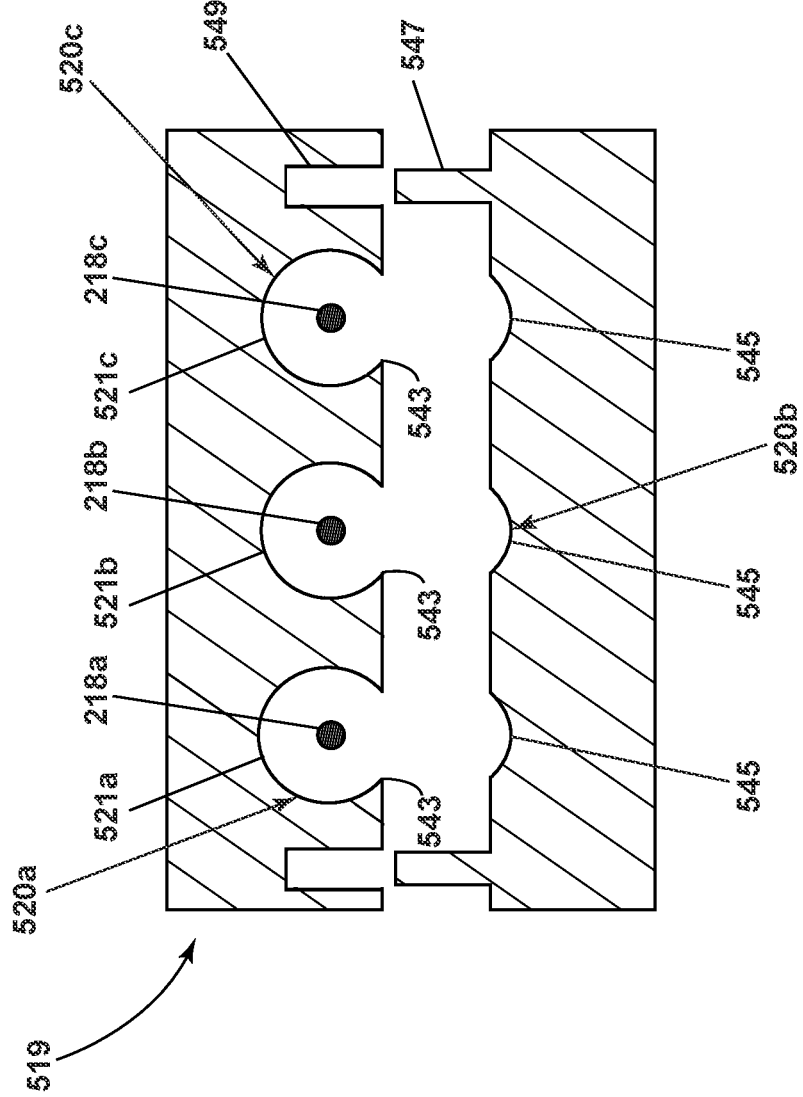
FIG. 9 is a variation of the plate of FIG. 8 in accordance with another exemplary embodiment of the present disclosure.

FIG. 9 is a partially exploded cross-sectional view of a plate 519 having a plurality of channels 521a, 521b, 521c and a cover plate 525. The plate 519 is similar to the plate 319, 419, the plurality of channels 421a, 421b, 421c are similar to the plurality of channels 321a, 321b, 321c, 421a, 421b, 421c, and the cover plate 525 is similar to the cover plate 425 therefore, like parts will be identified with like numerals further increased by 100, with it being understood that the description of the like parts of the plate 319, 419 and the plurality of channels 321a, 321b, 321c, 421a, 421b, 421c applies to the plate 519, the plurality of channels 521a, 521b, 521c, and the cover plate 525 unless otherwise noted.

The plurality of channels 521a, 521b, 521c receive the plurality of tows 218a, 218b, 218c. The plurality of tows 218a, 218b, 218c can enter the plurality of channels 521a, 521b, 521c by passing through openings 543. Once the plurality of tows 218a, 218b, 218c are received by the plurality of channels 521a, 521b, 521c, the cover plate 525 can be secured to the plate 519 to retain the plurality of tows 218a, 218b, 218c in the plurality of channels 521a, 521b, 521c.

Recesses 545 in the cover plate 525 can correspond to the plurality of channels 521a, 521b, 521c. The recesses 545 and the plurality of channels 521a, 521b, 521c can define a plurality of tow passages 520a, 520b, 520c.

Guides or fasteners illustrated by way of example as pin 547 can extend from the cover plate 525. Receiving portions illustrated as pin holes 549 in the plate 519 can receive the pins 547 when the plate 519 and the cover plate 525 are coupled together. While illustrated as pins 547 with corresponding pin holes 549, any mechanical or magnetic fastening system is contemplated that selectively secures the cover plate 525 to the plate 519.

Benefits associated with the use of the first metering device include a decrease in the variability of the amount of matrix attached to the fiber tows. The reduction in variability of the amount of matrix attached to the fiber tows reduces variability in the thickness of the prepreg tape. The variability in the prepreg tape wound around the drum determines the variability in cured ply thickness and thus effects the variability in the dimensions of CMC or PMC components. The disclosed invention describes a configuration that reduces the variability in matrix content, at times by 25%.

Further benefits associated with the first metering device or devices include that one end of the first metering device is immersed in the slurry bath. The combination of the immersion and the resistance created by the interior surface or lower surface and walls of the first metering device reduces the forward flow of slurry in the slurry bath and prevents depletion of slurry on the entry wheel or roller of the series of rollers.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A prepreg tape assembly for impregnating a dry fiber tow, the prepreg tape assembly comprising a bath defining a slurry reservoir, a series of rollers located in the bath, a first metering device having a tow passage with an inlet and an outlet, with the inlet overlying or within the slurry reservoir, and a take-up drum located out of the slurry reservoir.

The prepreg tape assembly of any preceding clause, wherein the first metering device extends from a first end located below a surface of the slurry reservoir to a second end located above the surface of the slurry reservoir, and wherein the first end defines the inlet and the second end defines the outlet.

The prepreg tape assembly of any preceding clause, wherein a metering length of the first metering device is measured along the tow passage where the tow passage has a minimum passage diameter or a minimum channel width, wherein the metering length is 25%-10,000% of the minimum channel width or the minimum passage diameter the first metering device.

The prepreg tape assembly of any preceding clause, wherein the first metering device includes an interior surface or a lower surface having a tapered portion.

The prepreg tape assembly any preceding clause, wherein the tapered portion is equal to or between 0.5% and 95% of a metering length measured along the tow passage where the tow passage has a minimum passage diameter or a minimum channel width.

The prepreg tape assembly of any preceding clause, wherein the first metering device includes an outlet taper.

The prepreg tape assembly of any preceding clause, further comprising a second metering device, spaced from the first metering device.

The prepreg tape assembly of any preceding clause, wherein the first metering device is an enclosed tube.

The prepreg tape assembly of any preceding clause, wherein the second metering device is a metering die located downstream of the enclosed tube.

The prepreg tape assembly of any preceding clause, wherein an aperture diameter of the second metering device is less than or equal to a minimum passage diameter of the enclosed tube.

The prepreg tape assembly of any preceding clause, wherein a ratio between a minimum value of the aperture diameter and the minimum passage diameter is equal to or between 0.10 and 0.95.

The prepreg tape assembly of any preceding clause, wherein the first metering device is a plurality of first metering devices, wherein the plurality of first metering devices are positioned relative to a plurality of rollers.

The prepreg tape assembly of any preceding clause, further comprising a plurality of second metering devices located downstream from the plurality of first metering devices, wherein the plurality of first metering devices is spaced from the plurality of second metering devices.

The prepreg tape assembly of any preceding clause, wherein an aperture diameter of at least one second metering device of the plurality of second metering devices is less than or equal to a minimum passage diameter of at least one first metering device of the plurality of first metering devices.

The prepreg tape assembly of any preceding clause, wherein the plurality of first metering devices are a plurality of enclosed tubes, wherein each enclosed tube of the plurality of enclosed tubes includes a tapered portion.

The prepreg tape assembly of any preceding clause, wherein the first metering device is plate having a set of channels, wherein each channel of the set of channels receives a tow from a plurality of tows.

The prepreg tape assembly of any preceding clause, wherein each channel of the set of channels has a channel depth between 110% and 1,000% of a diameter of at least one tow of a plurality of tows.

The prepreg tape assembly of any preceding clause, wherein each channel of the set of channels has a channel width between 110% and 1,000% of a diameter of at least one tow of a plurality of tows.

The prepreg tape assembly of any preceding clause, wherein each channel of the set of channels includes a lower surface having a tapered portion.

The prepreg tape assembly of any preceding clause, wherein the slurry reservoir includes one or more of matrix precursor materials, organic binders, or solvents.

The prepreg tape assembly of any preceding clause, further comprising a deflector located beneath at least the outlet of the first metering device.

A method for manufacturing a prepreg tape, the method comprising passing a tow over a series of rollers at least partially submerged in a slurry bath, wherein the tow carries at least a portion of the slurry, metering the slurry carried by the tow with a first metering device to decrease a slurry layer thickness, metering the slurry carried by the tow with a second metering device, downstream of the first metering device, and winding the tow carrying the metered slurry about a drum to form prepreg tape.

The method of any preceding clause, wherein the first metering device is an enclosed tube and the second metering device is a metering die, wherein the second metering device receives the tow after the first metering device has metered the slurry on the tow.

The method of any preceding clause, wherein the first metering device extends from beneath a surface of the slurry in the bath to a location above the surface of the slurry.

The method of any preceding clause, wherein the second metering device is a metering die.

What is claimed is:

1. A prepreg tape assembly for impregnating a dry fiber tow, the prepreg tape assembly comprising:
   a bath defining a slurry reservoir;
   a series of rollers located in the bath;
   a first metering device having a tow passage with an inlet and an outlet, wherein the first metering device extends from a first end located below a surface of the slurry reservoir to a second end located above the surface of the slurry reservoir, and wherein the first end defines the inlet and the second end defines the outlet with the inlet within the slurry reservoir; and
   a take-up drum located out of the slurry reservoir.

2. The prepreg tape assembly of claim 1, wherein a metering length of the first metering device is measured along the tow passage where the tow passage has a minimum passage diameter or a minimum channel width, wherein the metering length is 25%-10,000% of the minimum channel width or the minimum passage diameter the first metering device.

3. The prepreg tape assembly of claim 1, wherein the first metering device includes an interior surface or a lower surface having a tapered portion.

4. The prepreg tape assembly of claim 3, wherein the tapered portion is equal to or between 0.5% and 95% of a metering length measured along the tow passage where the tow passage has a minimum passage diameter or a minimum channel width.

5. The prepreg tape assembly of claim 1, further comprising a second metering device, spaced from the first metering device.

6. The prepreg tape assembly of claim 5, wherein the first metering device is an enclosed tube.

7. The prepreg tape assembly of claim 6, wherein the second metering device is a metering die located downstream of the enclosed tube.

8. The prepreg tape assembly of claim 7, wherein an aperture diameter of the second metering device is less than or equal to a minimum passage diameter of the enclosed tube.

9. The prepreg tape assembly of claim 8, wherein a ratio between a minimum value of the aperture diameter and the minimum passage diameter is equal to or between 0.10 and 0.95.

10. The prepreg tape assembly of claim 1, wherein the first metering device is a plurality of first metering devices, wherein the plurality of first metering devices are positioned relative to a plurality of rollers.

11. The prepreg tape assembly of claim 10, further comprising a plurality of second metering devices located downstream from the plurality of first metering devices, wherein the plurality of first metering devices is spaced from the plurality of second metering devices.

12. The prepreg tape assembly of claim 11, wherein an aperture diameter of at least one second metering device of the plurality of second metering devices is less than or equal to a minimum passage diameter of at least one first metering device of the plurality of first metering devices.

13. The prepreg tape assembly of claim 10, wherein the plurality of first metering devices are a plurality of enclosed tubes, wherein each enclosed tube of the plurality of enclosed tubes includes a tapered portion.

14. The prepreg tape assembly of claim 1, wherein the first metering device is plate having a set of channels, wherein each channel of the set of channels receives a tow from a plurality of tows.

15. The prepreg tape assembly of claim 14, wherein each channel of the set of channels has a channel depth between 110% and 1,000% of a diameter of at least one tow of a plurality of tows.

16. The prepreg tape assembly of claim 14, wherein each channel of the set of channels has a channel width between 110% and 1,000% of a diameter of at least one tow of a plurality of tows.

17. The prepreg tape assembly of claim 14, wherein each channel of the set of channels includes a lower surface having a tapered portion.

18. The prepreg tape assembly of claim 1, wherein the slurry reservoir includes one or more of matrix precursor materials, organic binders, or solvents.

19. The prepreg tape assembly of claim 1, further comprising a deflector located beneath at least the outlet of the first metering device.

* * * * *